United States Patent
Jacoby et al.

(10) Patent No.: US 8,151,813 B2
(45) Date of Patent: Apr. 10, 2012

(54) QUAD-REDUNDANT HYDRAULIC TRIP SYSTEM

(75) Inventors: James L. Jacoby, Sugar Land, TX (US); W Brian Piercy, League City, TX (US)

(73) Assignee: Invensys Systems, Inc., Foxboro, MA (US)

( * ) Notice: Subject to any disclaimer, the term of this patent is extended or adjusted under 35 U.S.C. 154(b) by 964 days.

(21) Appl. No.: 12/143,010

(22) Filed: Jun. 20, 2008

(65) Prior Publication Data
US 2009/0020161 A1 Jan. 22, 2009

Related U.S. Application Data

(60) Provisional application No. 60/945,770, filed on Jun. 22, 2007.

(51) Int. Cl.
*G05B 9/03* (2006.01)
*F16K 37/00* (2006.01)
*F16K 31/02* (2006.01)
*F16K 31/124* (2006.01)

(52) U.S. Cl. ........... 137/1; 137/557; 251/26; 251/30.01; 60/403

(58) Field of Classification Search .............. 137/1, 557; 251/26, 30.01; 60/403
See application file for complete search history.

(56) References Cited

U.S. PATENT DOCUMENTS

| | | | | |
|---|---|---|---|---|
| 2,851,047 A | * | 9/1958 | Eller | 251/26 |
| 3,488,029 A | * | 1/1970 | Durbin | 251/26 |
| 4,102,129 A | * | 7/1978 | Maes | 60/403 |
| 4,316,486 A | * | 2/1982 | Tandrup et al. | 137/625.64 |
| 4,637,587 A | * | 1/1987 | Kuhnlein | 251/30.01 |
| 5,626,070 A | * | 5/1997 | Sorbel | 91/521 |
| 6,155,282 A | | 12/2000 | Zachary et al. | |
| 6,435,202 B2 | | 8/2002 | Zachary et al. | |
| 6,478,048 B2 | | 11/2002 | Hays | |
| 6,722,383 B2 | * | 4/2004 | Summers et al. | 137/1 |
| 6,862,914 B1 | * | 3/2005 | Zachary et al. | 137/557 |
| 7,499,761 B2 | * | 3/2009 | Zachary et al. | 137/1 |

* cited by examiner

*Primary Examiner* — John Rivell
(74) *Attorney, Agent, or Firm* — Edward S. Jarmolowicz, Esq.

(57) ABSTRACT

A voting solenoid system and method is configured to selectively apply fluid pressure above and below a threshold value, to a fluid node. The voting solenoid arrangement includes first and second solenoid valve pairs, each pair including first and second solenoid valves. The valve pairs are located in parallel fluid communication with a fluid pressure source, each of the first and second solenoid valves being alternately actuatable between energized and de-energized states. The solenoid arrangement is configured so that a change of state of the first and second valves of either of the valve pairs alternately applies fluid pressure above and below the threshold value, to the fluid node.

19 Claims, 17 Drawing Sheets

QUAD-REDUNDANT HYDRAULIC TRIP SYSTEM

RELATED APPLICATION

This application claims the benefit of U.S. Provisional Application Ser. No. 60/945,770, entitled Quad-Redundant Hydraulic Trip System, filed on Jun. 22, 2007, the contents of which are incorporated herein by reference in their entirety for all purposes.

BACKGROUND

1. Field of the Invention

This invention relates to solenoid valves, and more particularly to an arrangement of solenoid valves in instrumentation and process control systems of a plant.

2. Background Information

Modern process or manufacturing plants contain innumerable operating components. These components are tied together to form systems controlled by instrumentation and control systems containing sensors and controllers. The instrumentation and control systems on such plants not only serve to control the functions of the various components in order to achieve the desired process conditions, but they also provide the facility to safely modify or discontinue the operation of all or a portion of the plant's systems in order to avoid an unsafe situation or condition.

Safety systems or configurations require routine testing in order to verify that they continue to properly perform the functions for which they were intended. From an operational and economic point of view, they also should not modify or discontinue the operation of the plant system unnecessarily. One of the means by which such safety systems function is by the securing or diverting of the supply of a certain process fluid or the supply of motive power to a plant system or component of a plant system. One of the means by which these safety functions may be accomplished is through the use of solenoid operated valves.

In operation, the solenoid valves of such systems serve to isolate and/or vent off the fluid or pneumatic source from the system when the solenoid valve changes state or position (e.g. when the valve is de-energized by switches or process monitoring sensors coupled thereto). The plant system and any system controlled thereby is then placed in a configuration designated for safety.

In many cases, the operation of individual solenoid valves may not be tested without actually tripping the system and undesirably modifying or discontinuing the operation of the plant system. Moreover, various configurations available for actuating safety shutoff valves generally require a trade-off between competing characteristics of safety and spurious trip rate.

For example, a "1 out of 2" voting solenoid valve arrangement generates a process modification (i.e. shutdown) when at least one of the two solenoids changes state. Such a configuration provides relatively high safety, with an associated relatively high spurious trip rate (i.e., a single faulty valve or sensor may generate a false trip). A "2 out of 2" voting solenoid valve arrangement requires actuation of two solenoid valves in order to trigger a modification of the plant system. This configuration has a relatively low spurious trip rate, since both solenoids must fail or otherwise change state to generate a spurious trip. However, the solenoid valves of this arrangement must be tested frequently to insure safety, since failure of only a single solenoid valve may effectively prevent the system from shutting down, etc.

Conventional quad voting solenoids provide a balance of safety and reliability, however these quad configurations generally utilize four solenoids in a relatively complex arrangement that tends to be difficult to install, test, and maintain.

The aforementioned drawbacks were addressed in "2 out of 3" voting solenoid valve arrangements disclosed in U.S. Pat. Nos. 6,155,282 to Zachary et al., 6,435,202 to Zachary et al., and 6,478,048 to Hays, all assigned to Invensys Systems, Inc. These arrangements provide relatively high safety, low spurious tripping and a relatively low installation cost, while also enabling on-line testing of each solenoid valve individually without process interruption. These arrangements are typically taken off-line, using suitable bypass valves, for servicing or replacement.

There exists a need for a voting solenoid configuration which combines the features of relatively high safety with relatively low spurious trip rate, which is also relatively easy to install and test. A need also exists for such a configuration in which components thereof may be serviced or replaced while the remainder of the configuration continues to protect the process.

SUMMARY

In one aspect of the invention, a voting solenoid arrangement is configured to selectively apply fluid pressure above and below a threshold value, to a fluid node. The voting solenoid arrangement includes first and second solenoid valve pairs, each pair including first and second solenoid valves. The valve pairs are located in parallel fluid communication with a fluid pressure source, each of the first and second solenoid valves being alternately actuatable between energized and de-energized states. The solenoid arrangement is configured so that a change of state of the first and second valves of either of the valve pairs alternately applies fluid pressure above and below the threshold value, to the fluid node.

Another aspect of the invention includes a method for selectively applying fluid pressure above and below a threshold value to a fluid node. The method includes providing first and second solenoid valve pairs, each pair including first and second solenoid valves, the first and second solenoid valves being alternately actuatable between energized and de-energized states. The valve pairs are placed in parallel fluid communication with a fluid pressure source. The first and second solenoid valves are placed in fluid communication with one another so that a change of state of the first and second solenoid valves of either of the valve pairs is configured to alternately apply fluid pressure above and below the threshold value, to the fluid node.

In yet another aspect of the invention, a voting solenoid arrangement is configured to selectively apply fluid pressure above and below a threshold value, to a fluid node. The voting solenoid arrangement includes first and second solenoid valve pairs, each pair including first and second solenoid valves. The valve pairs are located in parallel fluid communication with a fluid pressure source, each of the first and second solenoid valves being alternately actuatable between energized and de-energized states. The solenoid arrangement is configured so that a change of state of the first and second valves of either of the valve pairs alternately applies fluid pressure above and below the threshold value, to the fluid node. The valve pairs are selectively disposed in parallel fluid communication with a low pressure fluid reservoir, the low pressure being below the threshold value. A plurality of shutoff valves are configured to selectively isolate either one of the valve pairs from the fluid node, so that the applied pressure is maintained by the other of the valve pairs. A plurality of pressure sensors is operatively associated with one or more of the first and second solenoid valves to indicate the state thereof. The solenoid arrangement is configured so that the applied fluid pressure is above the threshold pressure when the first and second solenoid valves of either of the valve pairs are disposed in the energized state.

The features and advantages described herein are not all-inclusive and, in particular, many additional features and advantages will be apparent to one of ordinary skill in the art in view of the drawings, specification, and claims. Moreover, is should be noted that the language used in the specification has been principally selected for readability and instructional purposes, and not to limit the scope of the inventive subject matter.

DETAILED DESCRIPTION

Figure 1:
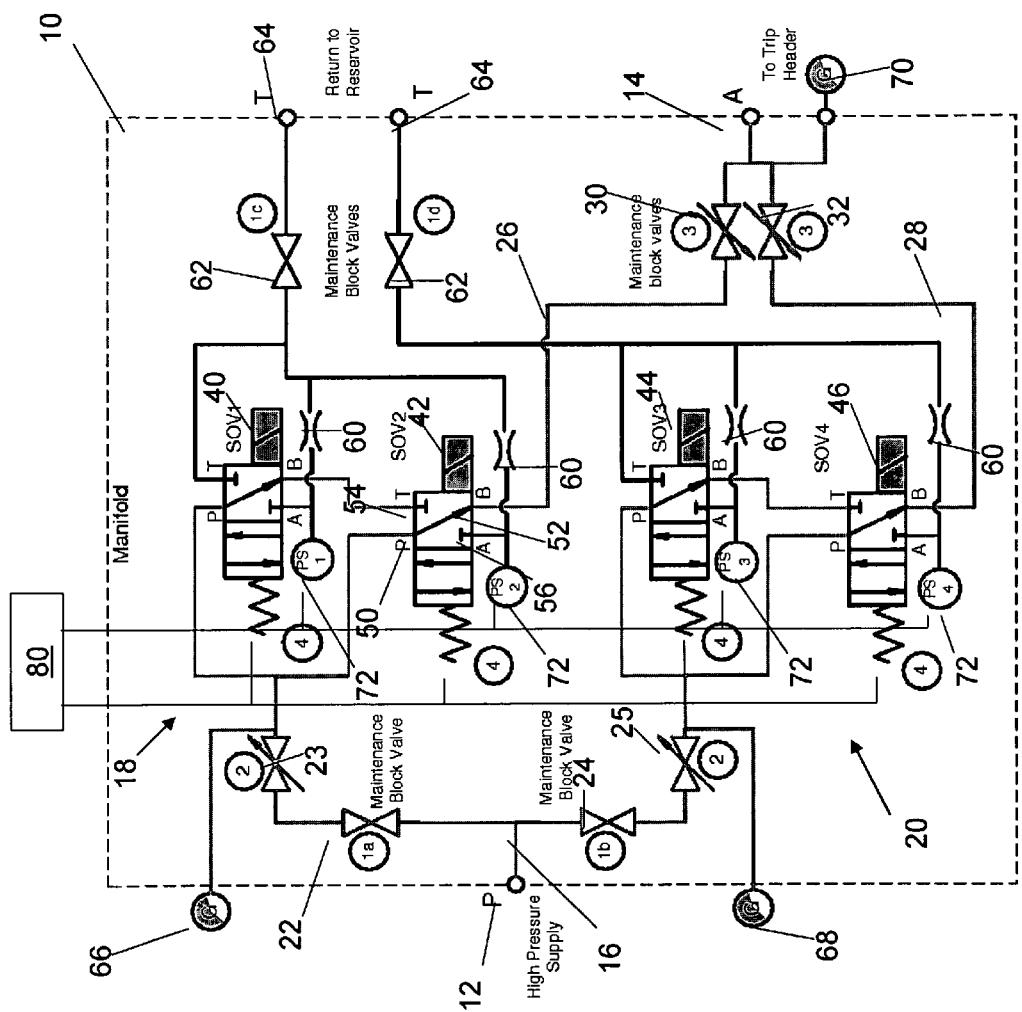
FIGS. 1-8 are schematic circuit diagrams of an embodiment of a solenoid arrangement of the present invention, in various operational states.

Referring to the figures set forth in the accompanying drawings, the illustrative embodiments of the present invention will be described in detail hereinbelow. For clarity of exposition, like features shown in the accompanying drawings are indicated with like reference numerals and similar features as shown in alternate embodiments in the drawings are indicated with similar reference numerals.

Referring to the figures, an apparatus constructed according to the principles of the present invention is shown. Embodiments of the present invention include voting solenoid arrangements 10, 10' which operate in a "2 out of 4" manner to provide relatively high safety, low spurious tripping and a relatively low installation cost, while enabling on-line testing and servicing/replacement of each solenoid individually without process interruption. Solenoid arrangements 10, 10' are preferably manifolded (not shown), to facilitate maintenance, and to simplify installation and replacement.

Referring now to FIG. 1, an embodiment of the present invention will be more thoroughly described. As shown, voting solenoid arrangement 10 is configured to selectively maintain fluid pressure (e.g., air or hydraulic fluid) above a threshold level within a process, e.g., at a node 14 thereof. Node 14 may be a component of a plant process, instrumentation or control system. In particular embodiments, the node may be a conventional trip header, at which a decrease in fluid pressure will generate a shut-down of the process. Any suitable fluid may be utilized, such as hydraulic fluid, water, air, etc. In particular embodiments, solenoid arrangement 10 is hydraulic, and thus relies on hydraulic fluid. In this embodiment, the pressurized fluid is fed from supply 12 to solenoid arrangement 10 through conduit 16. This conduit 16 branches to supply parallel sets of SOV pairs 18 and 20 via maintenance block valves 22 and 24 disposed in series with throttle (adjustable) valves 23 and 25, respectively. After passing through the SOV pairs, the fluid subsequently flows through parallel conduits 26 and 28, via maintenance block throttle (adjustable flow) valves 30 and 32 respectively, which then converge at trip header 14.

Voting solenoid arrangement 10 includes four discrete solenoid valves, including valves 40 and 42 of pair 18, and valves 44 and 46 of pair 20. At least three of the solenoid valves must be actuated (e.g., energized) to enable fluid flow (pressurization) to be conveyed from supply 12 to trip header 14. In particular embodiments, both solenoid valves of either pair 18, 20 must be de-energized to stop the fluid flow to (or reduce fluid pressure at) header 14.

In the embodiment shown, the solenoid valves are each 4-port 2-position solenoid valves. These valves are thus operable with fluid flowing therethrough along three distinct pathways. For example, each valve includes a pair of common ports 50 and 52 which are selectively and alternately coupled to one another, and to other ports 54 and 56, respectively, by alternate fluid pathways. (For clarity, these ports are numbered only on valve 42, with the understanding that they similarly apply to the corresponding ports of valves 40, 44 and 46). As shown, in a first (i.e., energized) state, ports 50 and 52 of each solenoid valve are coupled to one another. In a second (de-energized) state, ports 50 and 52 decoupled from one another, and are respectively coupled to ports 56 and 54 (see, e.g., valve 40, FIG. 2).

Conduit 16 supplies fluid simultaneously to ports 50 of each solenoid valve 40, 42, 44 and 46. When the valves are in their energized states as shown, the fluid pathways between ports 50 and 52 are open, permitting fluid/pressure flow therethrough. These open pathways permit the fluid to respectively flow from ports 52 of valves 42 and 46 to conduits 26 and 28, to supply fluid pressure to trip header 14. Thus, when energized as shown, each valve pair 18 and 20 provides an alternate, parallel fluid pathway coupling fluid supply 12 to trip header 14. As also shown, pressure gauges 66 and 68 may be disposed at upstream sides of each SOV pair 18 and 20, while another pressure gauge 70 is disposed proximate to trip header 14. These gauges are darkened as shown to indicate pressure thereat when the SOVs are in their energized state.

As also shown, when the SOVs are in their energized states, the fluid may pass through conduits respectively coupling ports 52 of valves 40 and 44, to ports 54 of valves 42 and 46. These ports 54 are effectively closed, preventing further fluid/pressure flow therethrough. Ports 56 of each valve are coupled via a flow constrictor 60 (e.g., an orifice plate or the like) and a maintenance block valve 62, to a low pressure fluid reservoir 64. Each port 56 may also be coupled to a pressure switch or transducer 72. Switch 72 may be triggered upon application of a predetermined fluid pressure thereto, to indicate to a control system 80, that the valves have changed state, as will be discussed hereinbelow with respect to FIGS. 2-8.

The various maintenance block valves associated with the SOV pairs, including valves 22, 30 and 62 for SOV pair 18, and valves 24, 32 and 62 for SOV pair 20 may be closed to effectively isolate either pair from the arrangement 10. This isolation permits elements associated with one SOV pair to be serviced or replaced, while the other pair continues to function and protect the process served by the trip header 14.

Figure 2:
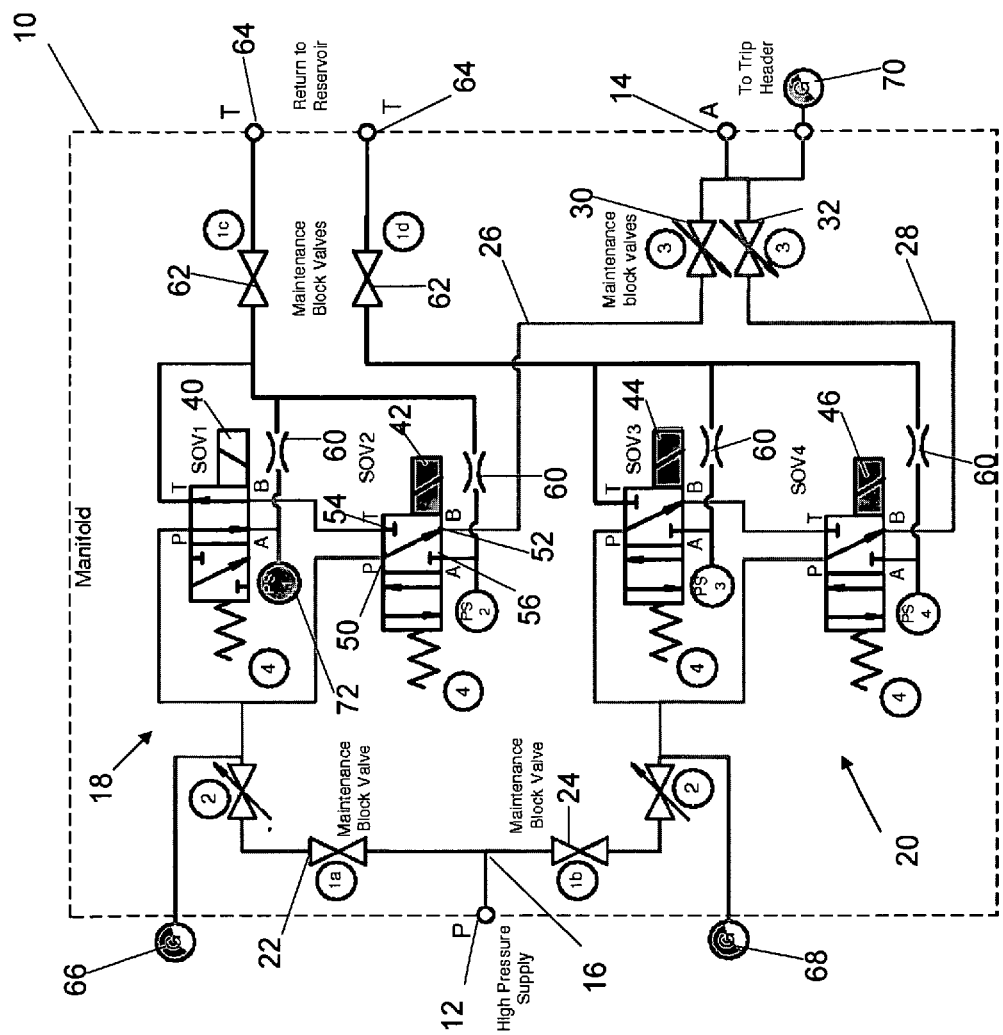
Figure 3:
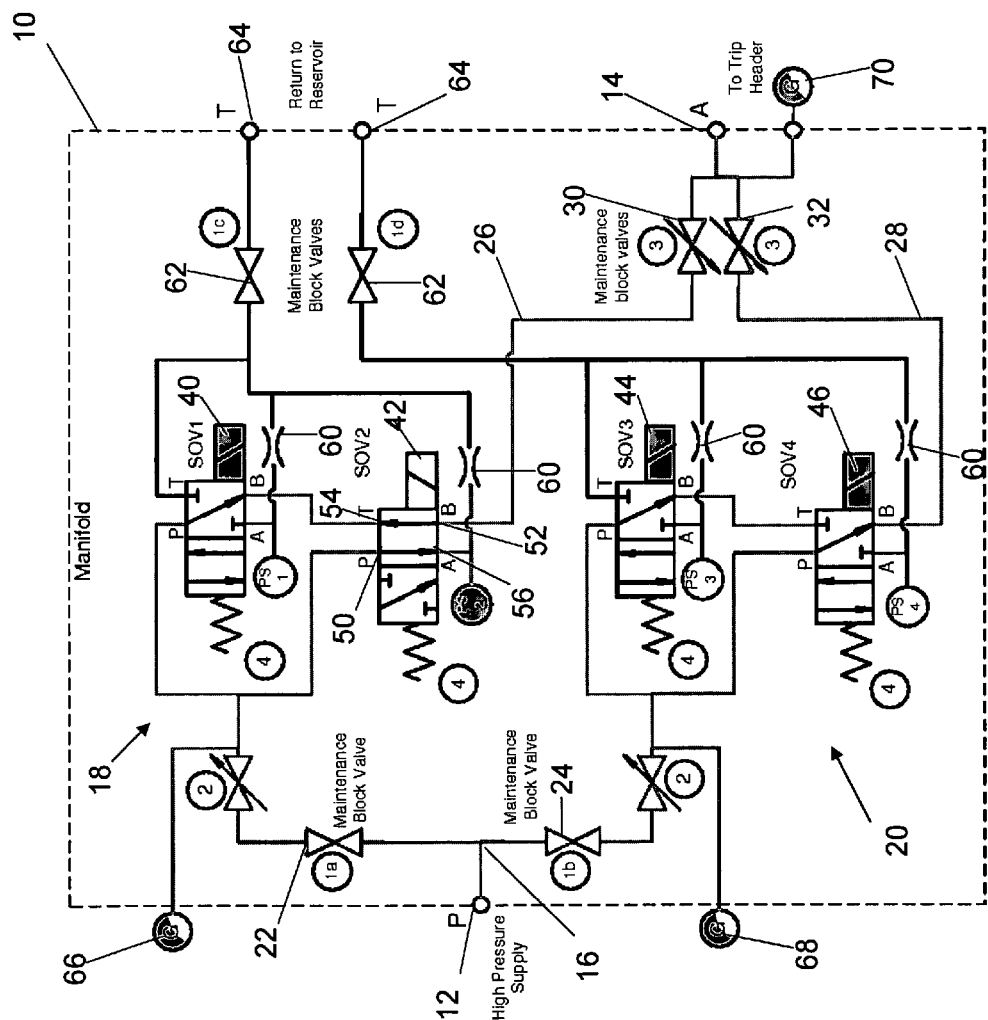
Figure 4:
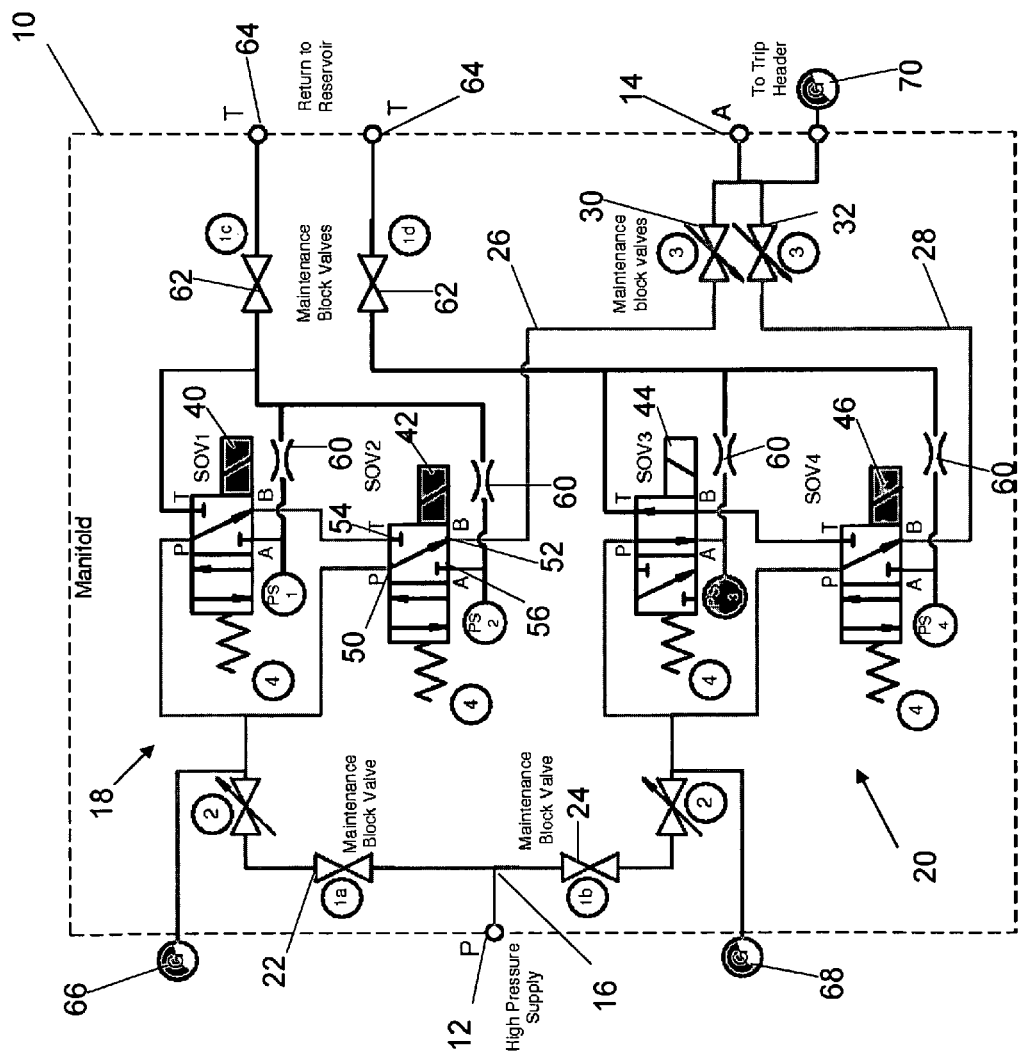
Figure 5:
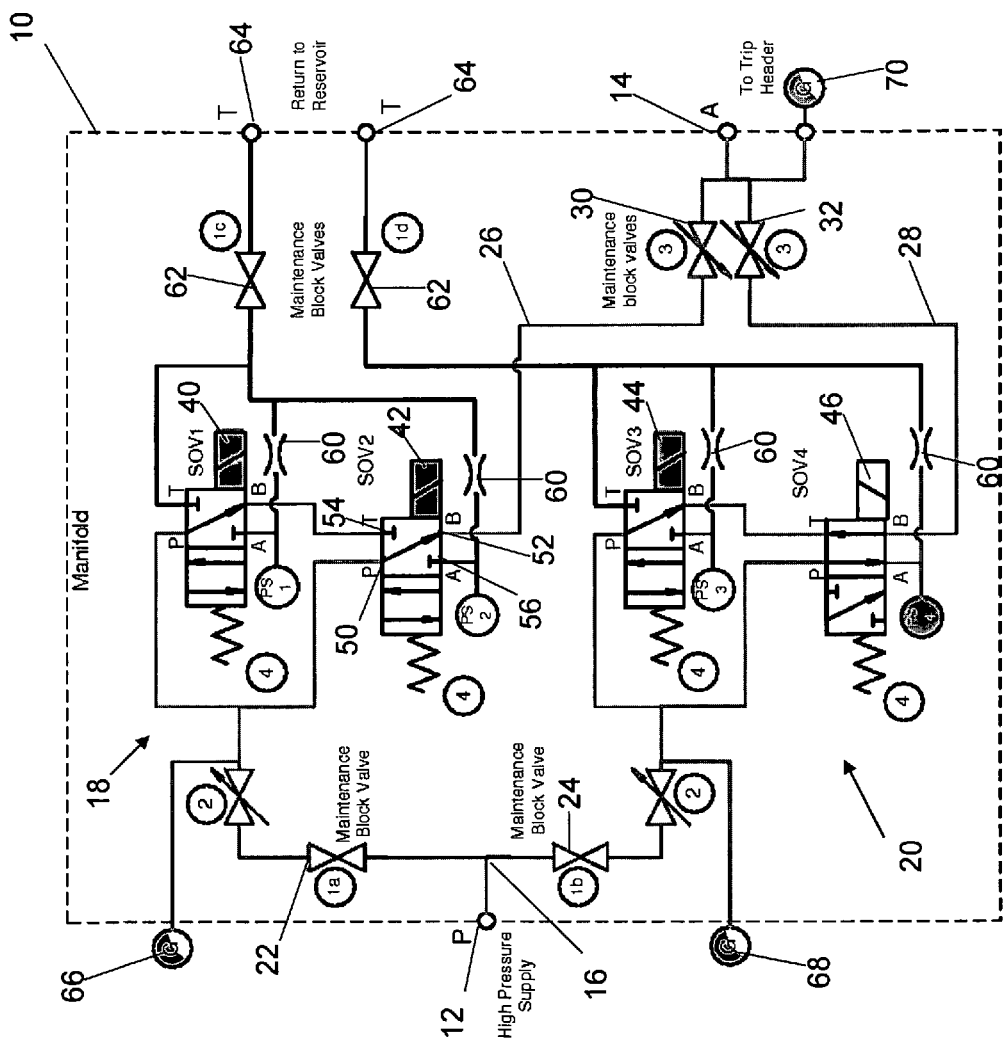

Turning now to FIGS. 2-5, in the event of a change of state of any single valve 40, 42, 44 or 46, such as in the event of a valve failure or a valve test, fluid/pressure will continue to pass through the solenoid arrangement 10 to the trip header 14. For example, when valve 40 is de-energized as shown in FIG. 2, fluid flowing to its port 50 is coupled to its port 56, which pressurizes the conduit upstream of its flow restriction 60, to trigger pressure switch 72 as shown. Fluid will flow through the restriction, tending to lower pressure upstream thereof. However, the flow restriction 60 associated with each SOV is sized so that the fluid pressure will remain above a predetermined threshold level, to maintain a desired pressure at trip header 14 as evidenced by pressure gauge 70. Similar de-energization of individual ones of valves 42, 44 and 46 is shown at FIGS. 3-5, respectively.

Figure 6:
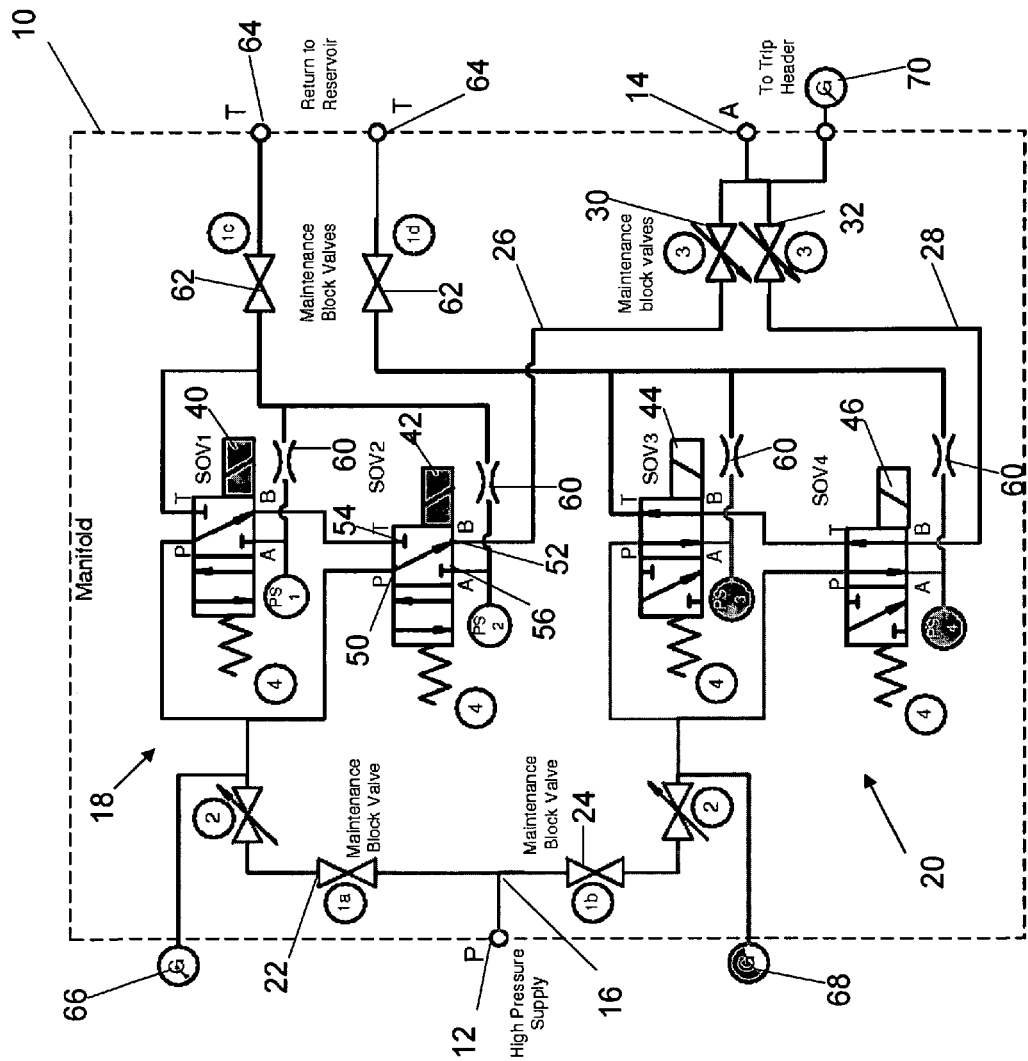
Figure 7:
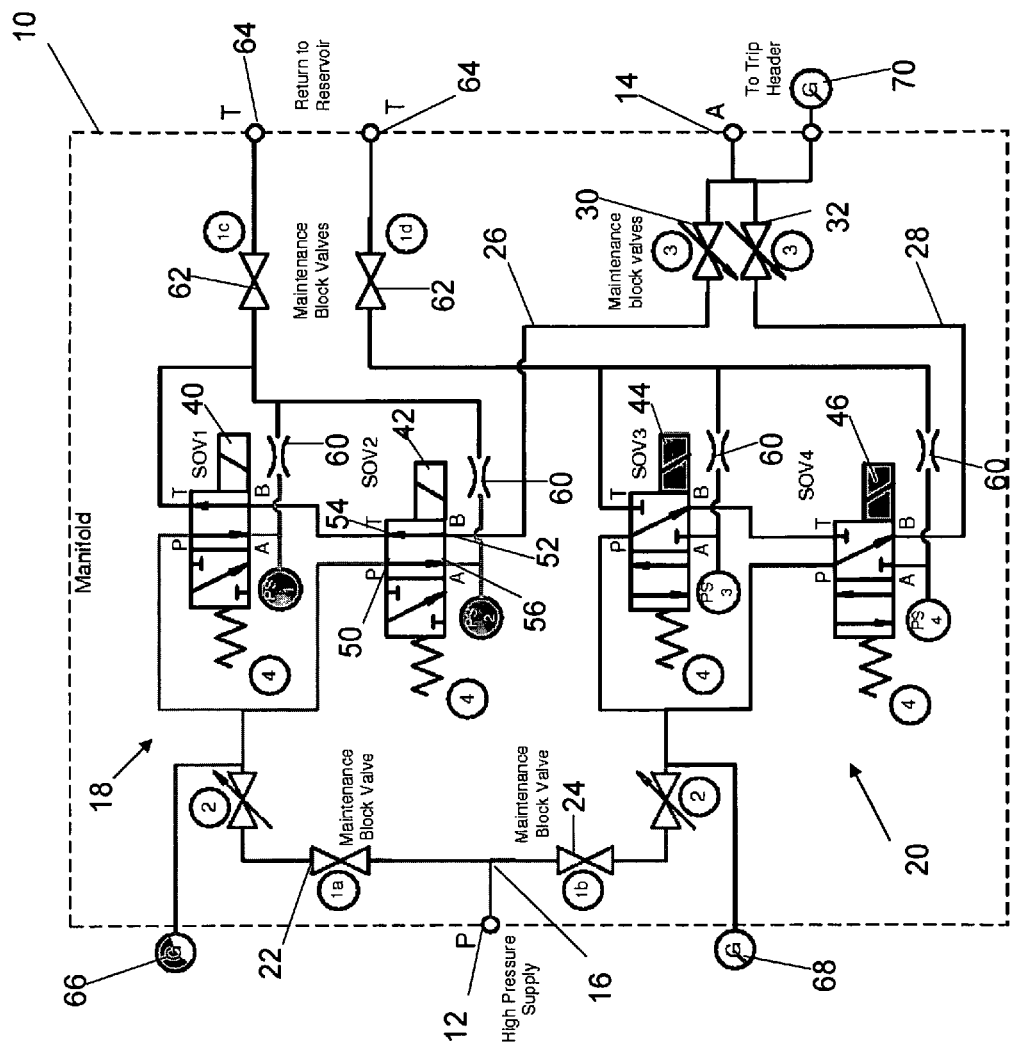

Referring now to FIGS. 6-7, de-energization of both valves of either SOV pair 18, 20 will drop pressure at trip header 14 below the threshold level, as shown at gauge 70. In FIG. 6, valves 44 and 46 of SOV pair 20 have been de-energized, while in FIG. 7, both valves of SOV pair 18 have been de-energized. In these instances, when both valves are de-energized, the conduit 28 (or 26) connected to the trip header 14 is vented through the de-energized valves (e.g., through ports 52 and 54 thereof, to the low-pressure reservoir at 64. This routing of the fluid/pressure through the valve pair 20 (or 18) serves to sufficiently lower pressure at trip header 14 to shut down a process (e.g., a turbine) in the event of an emergency. It is noted that in the embodiment shown, restrictions 60 are provided to allow fluid pressure to bleed off the pressure switches 72 once their respective valves 40, 42, 44, 46 are re-energized. These restrictions are relatively small to prevent significant pressure drop during testing, as will be discussed in greater detail hereinbelow. In particular embodiments, these restrictions are sufficiently small so that the flow, even through all four simultaneously, would not be sufficient (by themselves) to lower pressure at trip header 14 below the threshold pressure.

Figure 8:
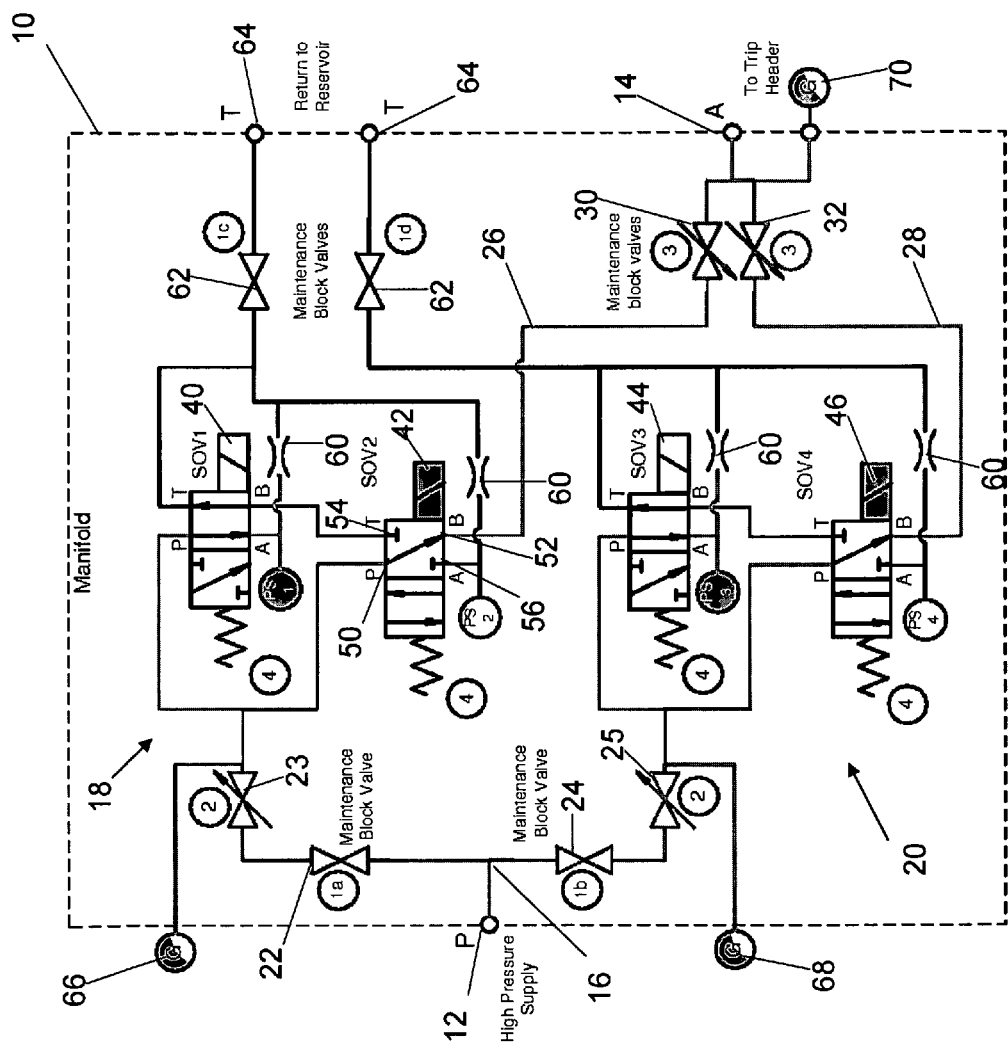
Figure 9:
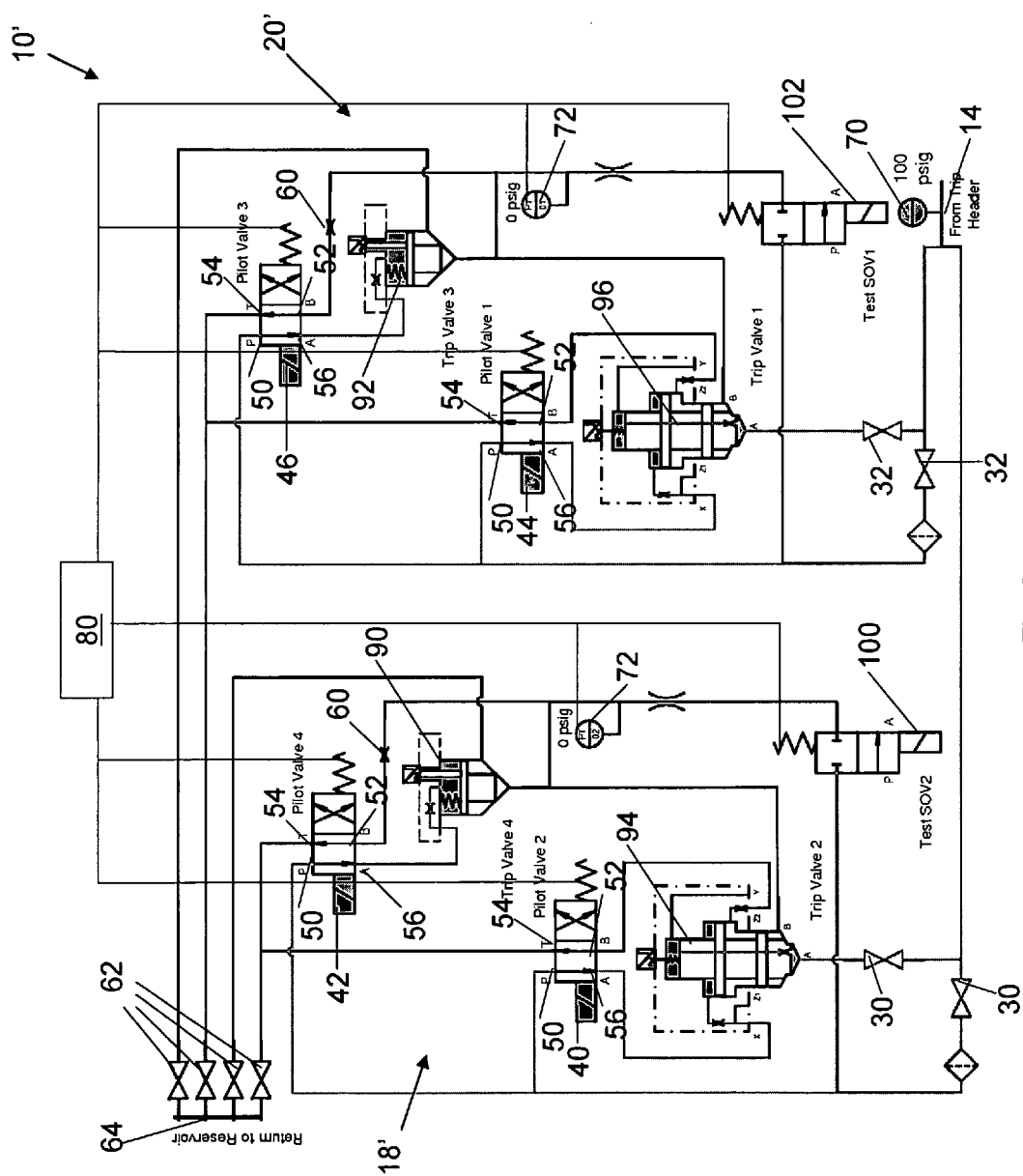
FIGS. 9-17 are schematic circuit diagrams of another embodiment of a solenoid arrangement of the present invention, in various operational states.

Turning now to FIG. 8, it should be recognized that embodiments of the present invention may be configured so that system pressure will be maintained above the threshold value even in the event two valves from different SOV pairs are de-energized. For example, even though valve 40 (of pair 18) and valve 44 (of pair 20) are de-energized, trip header 14 remains pressurized above the threshold level, as shown by gauge 70. The restrictors 60 are sized to prevent significant flow when one valve per valve pair is de-energized, thus maintaining the trip header pressure well above the trip pressure threshold. The restrictors 60 provide a path to drain for the fluid once the associated valve is energized, thus allowing the pressure transducer 72 to indicate a low pressure which serves to validate the energized state of the valve. As discussed hereinabove, solenoid valves 40, 42, 44 and 46 may each be provided with a pressure switch 72 to monitor the actual state of the valves. The contacts of these pressure switches 72 may be communicably coupled to a process control system 80 which may also be communicably coupled to each valve 40, 42, 44, 46, as shown in FIG. 1. It should be noted that pressure switches/transducers 72, and/or gauges 66, 68, 70, etc., may be conventional pressure transmitters, such as available from Invensys Systems, Inc. (Foxboro, Mass.), which may be configured to provide substantially continuous pressure indication to control system 80.

System 80 may thus be programmed to automatically verify operation of each individual solenoid valve by periodically de-energizing each valve and capturing the output of its associated pressure switch 72 to confirm its change of state. Control system 80 may also be coupled to one or more of pressure gauges 66, 68, 70, to provide enhanced monitoring capabilities. The present invention thus enables each solenoid valve to be automatically tested with closed-loop feedback without disrupting fluid flow to trip header 14. In this manner, the solenoid arrangement 10 may be tested frequently without disrupting plant process operation. In addition, safety is enhanced by effectively dropping fluid flow/pressure at trip header 14 upon de-energization of fewer than all of the solenoid valves, i.e., fluid flow/pressure may be abated upon a change of state of as few as two of the solenoid valves. This effectively permits solenoid arrangement 10 to safely shut down a process associated with trip header 14, even in the event one of the valves 40, 42, 44, 46 fails in its energized state and becomes non-operational. Such safety is achieved while providing the low spurious trip rate achieved by requiring at least two solenoids to change state before dropping the fluid pressure below the threshold level.

Moreover, the parallel matched valve pairs of the embodiments of this invention enable components thereof to be isolated for service and/or replacement, without taking configuration 10 off-line or otherwise leaving the process unprotected.

Still further, embodiments of this invention are shown and described with solenoid valves 40, 42, 44, 46 disposed in their energized states during application of high (i.e., over-threshold) fluid pressure to trip header 14. This generally provides increased safety, since any interruption in power to the solenoid valves will tend to generate a change in state of the valves to drop fluid flow/pressure to trip header 14. However, these solenoid valves may be disposed in their de-energized state during normal fluid flow therethrough, without departing from the spirit and scope of the present invention. Similarly, although the contacts of pressure switches 72 may be disposed in their open states when the solenoid valves are de-energized, any, or all of these contacts may be disposed in their closed states when the valves are de-energized, without departing from the spirit and scope of the present invention.

Also, in the embodiments shown, ports 56 of the valves (and ports 54 of valves 40 and 44), are coupled to a fluid recovery reservoir at 64. However, these ports may also be vented to atmosphere, such as in the event working fluid such as air (i.e., a pneumatic system) is used instead of hydraulic fluid, without departing from the spirit and scope of the invention.

Turning now to FIGS. 9-17 an alternate embodiment of the present invention is shown as voting solenoid arrangement 10'. This embodiment is in many respects substantially similar to solenoid arrangement 10, while being suited to the use of relatively lower fluid pressures and/or applications in which trip header 14 is pressurized independently (e.g., effectively upstream) of the solenoid arrangement as shown.

Solenoid arrangement 10' includes solenoid valves 40, 42, 44, 46 arranged in valve pairs 18' and 20'. In this embodiment, each valve pair 18', 20' also includes a pair of slave pilot valves, 90, 94, and 92, 96, respectively. In the embodiment shown, slave valves 90 and 92 are poppet valves with internal springs serving to maintain the valves in a normally (but not completely) closed position. Fluid pressure supplied to their pilot ports serves to provide increased closing force to fully close these valves. As shown, their pilot ports are respectively coupled to port 56 of valves 42 and 46. The downstream side of these valves is coupled to fluid reservoir 64 via block valves 62, while their upstream sides are coupled to the downstream ports of slave valves 94, 96, respectively. The upstream ports of valves 94, 96 are each coupled to trip header 14, via block valves 30 as shown. Moreover, valves 94, 96, are provided with two pilot ports respectively configured to both open and close the valves. The open pilot ports are respectively fed by ports 52 of valves 40, 44, while the close pilot ports are fed by ports 56 of valves 40, 44.

As also shown, ports 54 of solenoid valves 42 and 46 are coupled to reservoir 64 via respective block valves 62. Ports 52 of these valves 42, 46 are coupled to trip header 14 via respective test solenoid valves 100, 102. Pressure transducers 72 are disposed between a pair of flow constrictors 60, all of which are disposed between ports 52 of valves 42, 46, and valves 100, 102.

In this embodiment, when valves 40, 42, 44, 46 are in their first or energized states as shown, the fluid pathways between ports 50 and 56 are open, permitting the fluid/pressure to flow therethrough. These open pathways permit the fluid pressure to close the slave valves 90, 92, 94, 96, which effectively prevents fluid from draining to reservoir 64. Thus, when energized, each valve pair 18' and 20' maintains a relatively high pressure (e.g., above a predetermined threshold) at trip header 14, as indicated by pressure gauge 70.

The various maintenance block valves associated with the SOV pairs, including valves 30 and 62 for SOV pair 18', and valves 32 and 62' for SOV pair 20' may be closed to effectively isolate either pair from the arrangement 10'. This isolation permits elements associated with one SOV pair to be serviced or replaced, while the other pair continues to maintain the pressure at the trip header, while also protecting the process served by the trip header 14.

Figure 10:
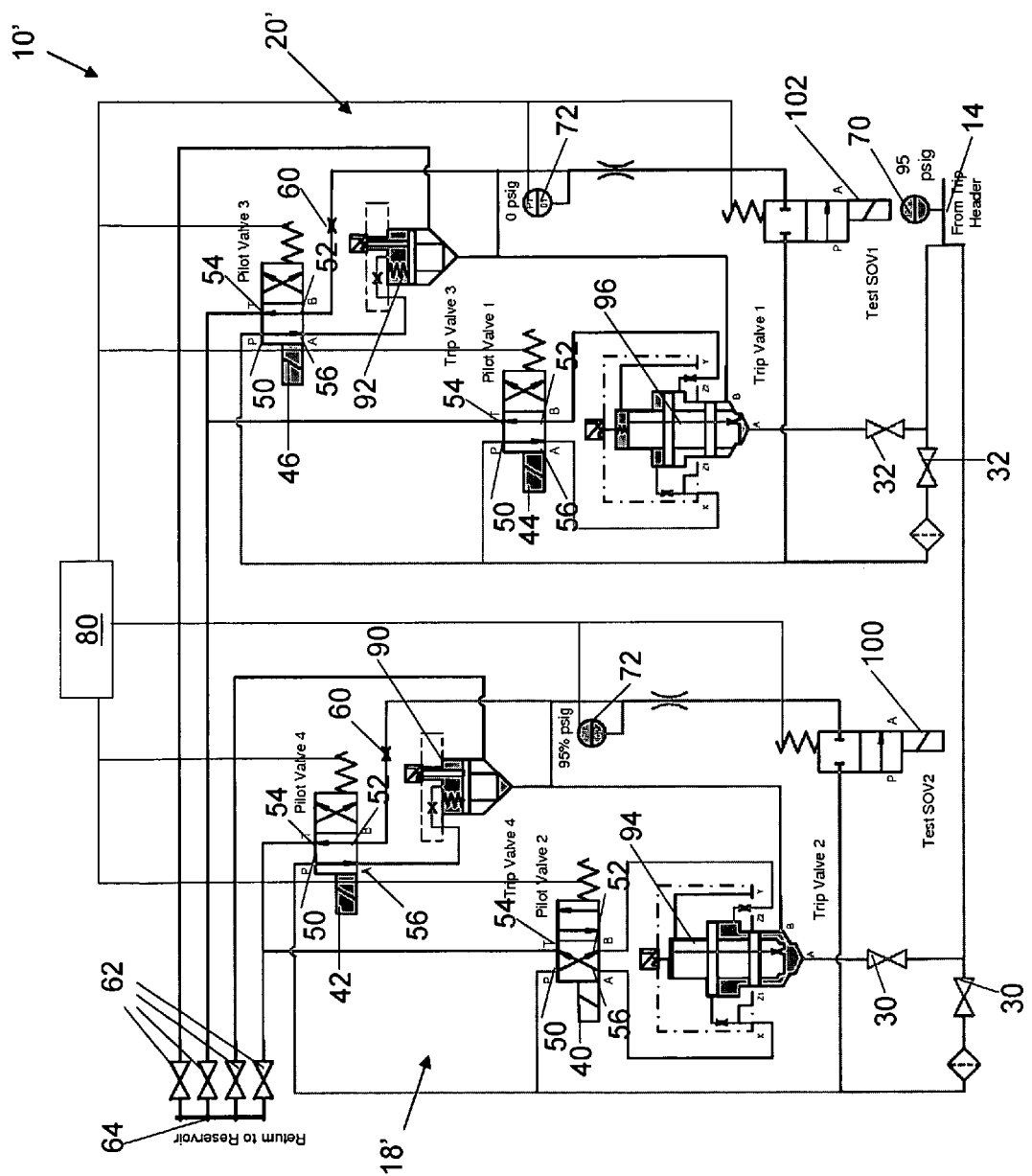

Turning now to FIGS. 10-13, in the event of a change of state of any single valve 40, 42, 44 or 46, such as in the event of a valve failure or a valve test, fluid will continue to be maintained above the threshold pressure at trip header 14. For example, when valve 40 is de-energized as shown in FIG. 10, fluid/pressure flowing to its port 50 is coupled to its port 52, which pressurizes the open pilot port of valve 94, to open valve 94 and permit flow to the upstream side of valve 90. Valve 90, however, remains closed, to maintain the relatively high, over-threshold, fluid pressure at trip header 14.

Figure 11:
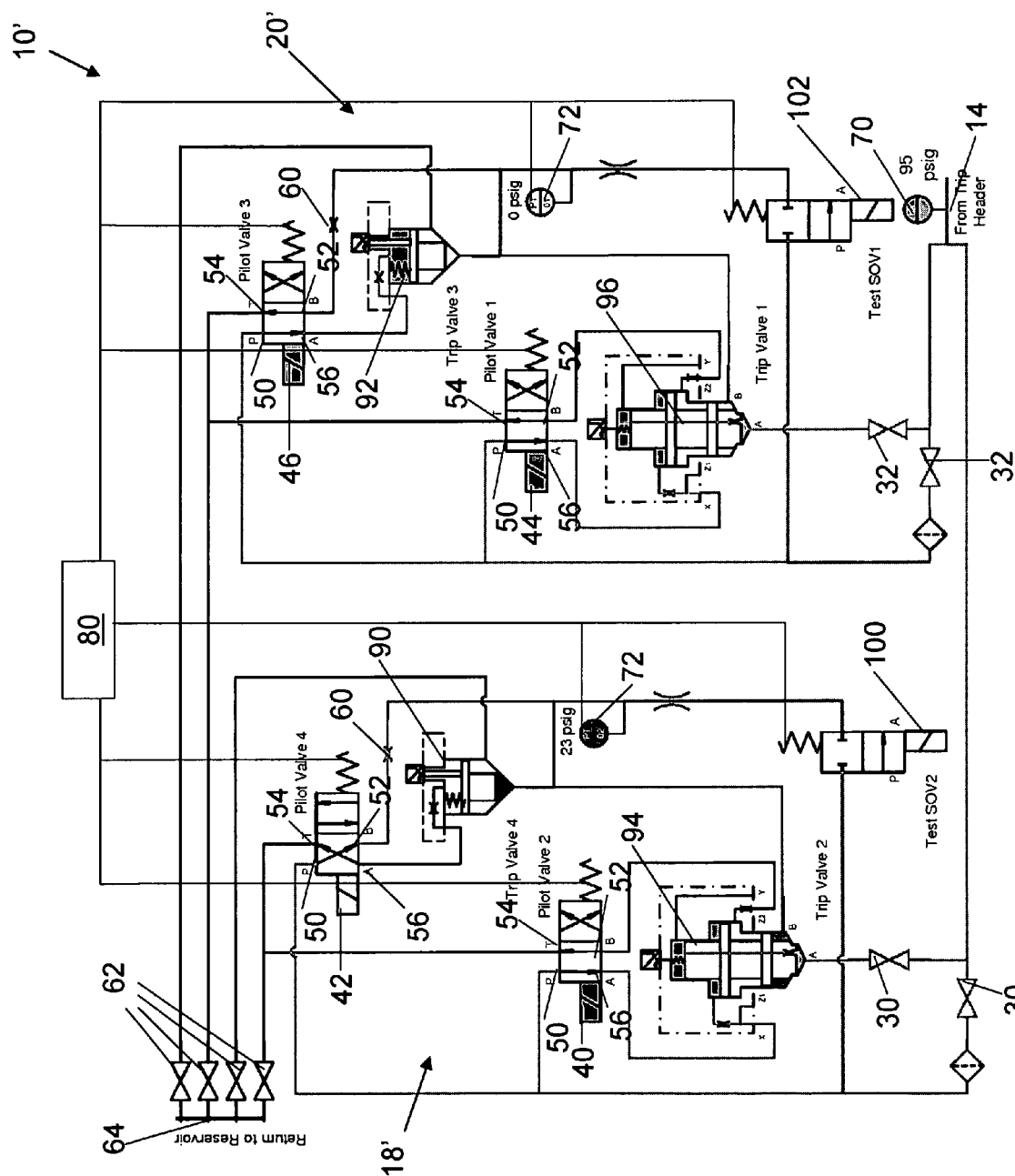
Figure 12:
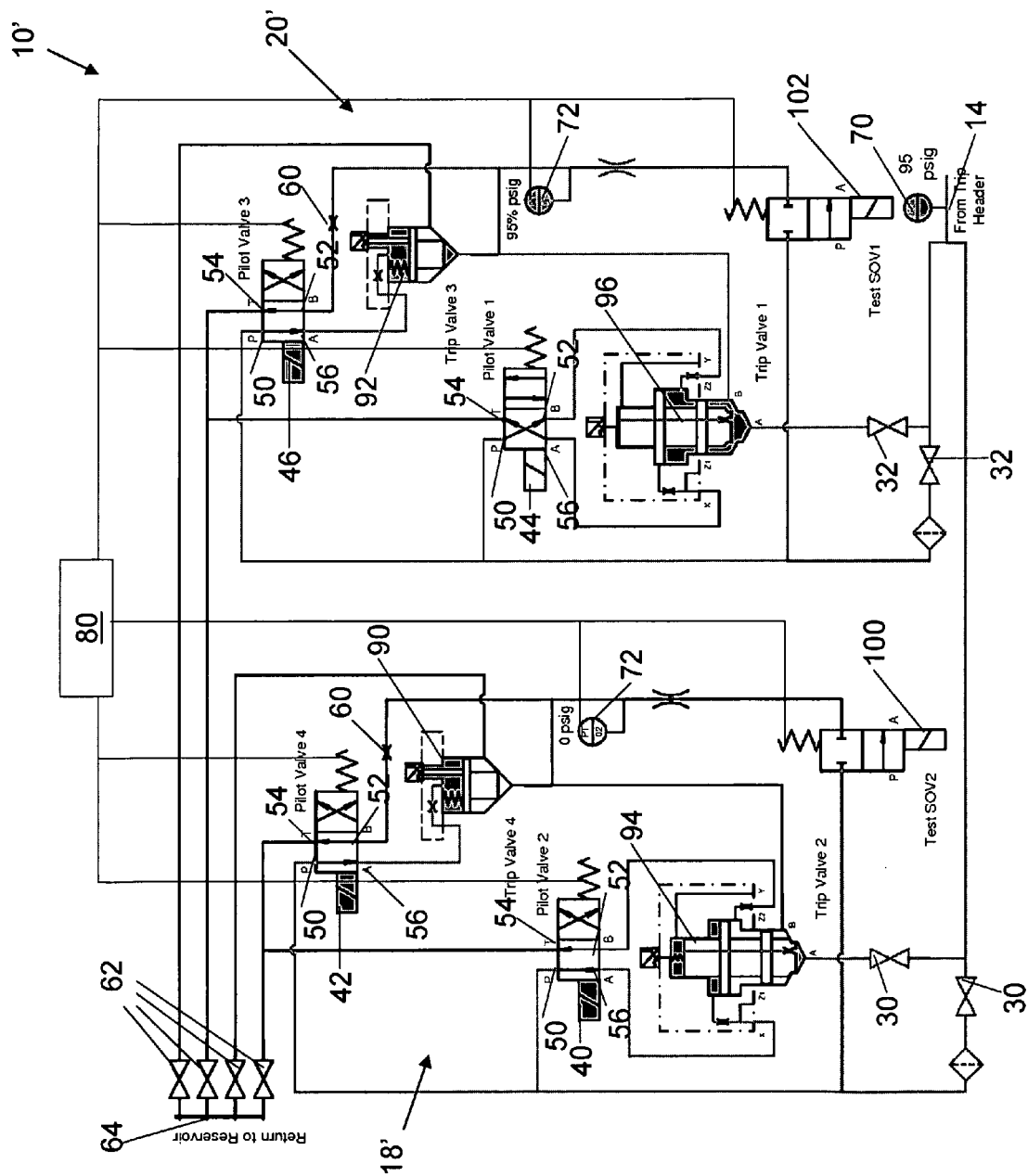
Figure 13:
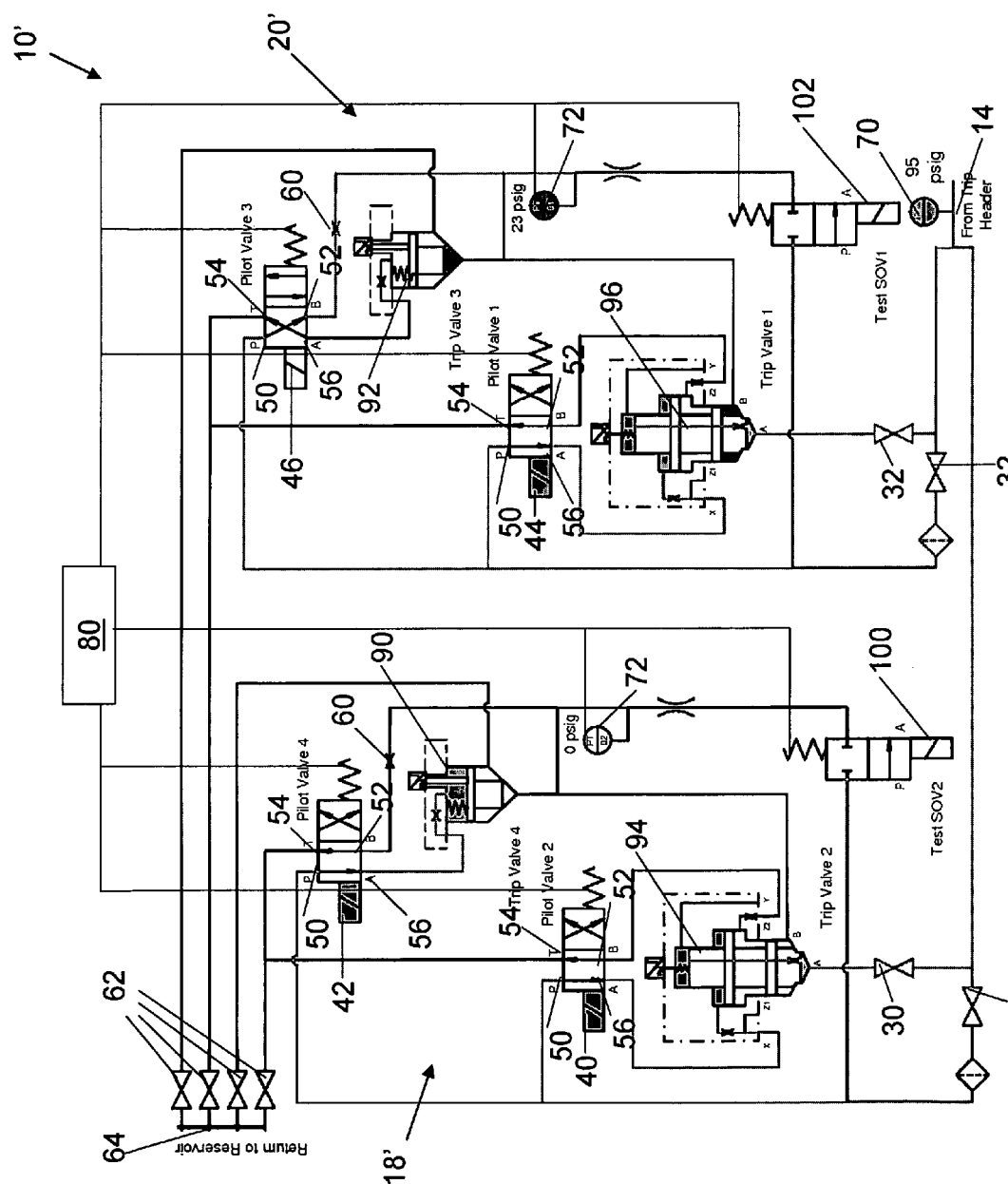

Referring now to FIG. 11, de-energization of valve 42 couples its ports 54 and 56 to one another, to vent the pilot port of valve 90 to the low pressure reservoir 64. This venting enables valve 90 to return to its partially open rest position. However, pilot valve 94 remains closed, to prevent the open valve 90 from significantly lowering pressure at trip header 14. Similar de-energization of individual ones of valves 44 and 46 are shown at FIGS. 12 and 13, respectively.

Figure 14:
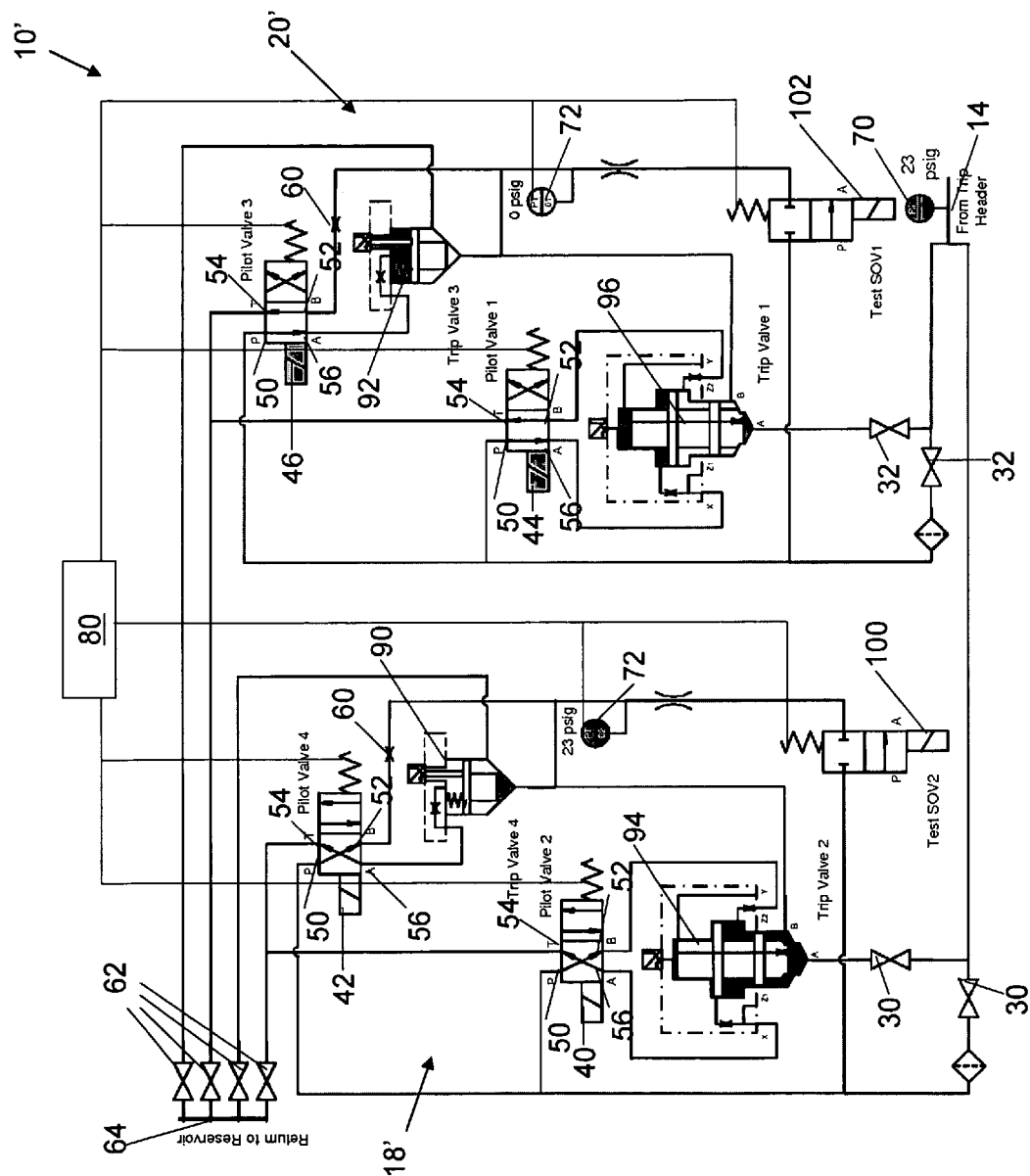
Figure 15:
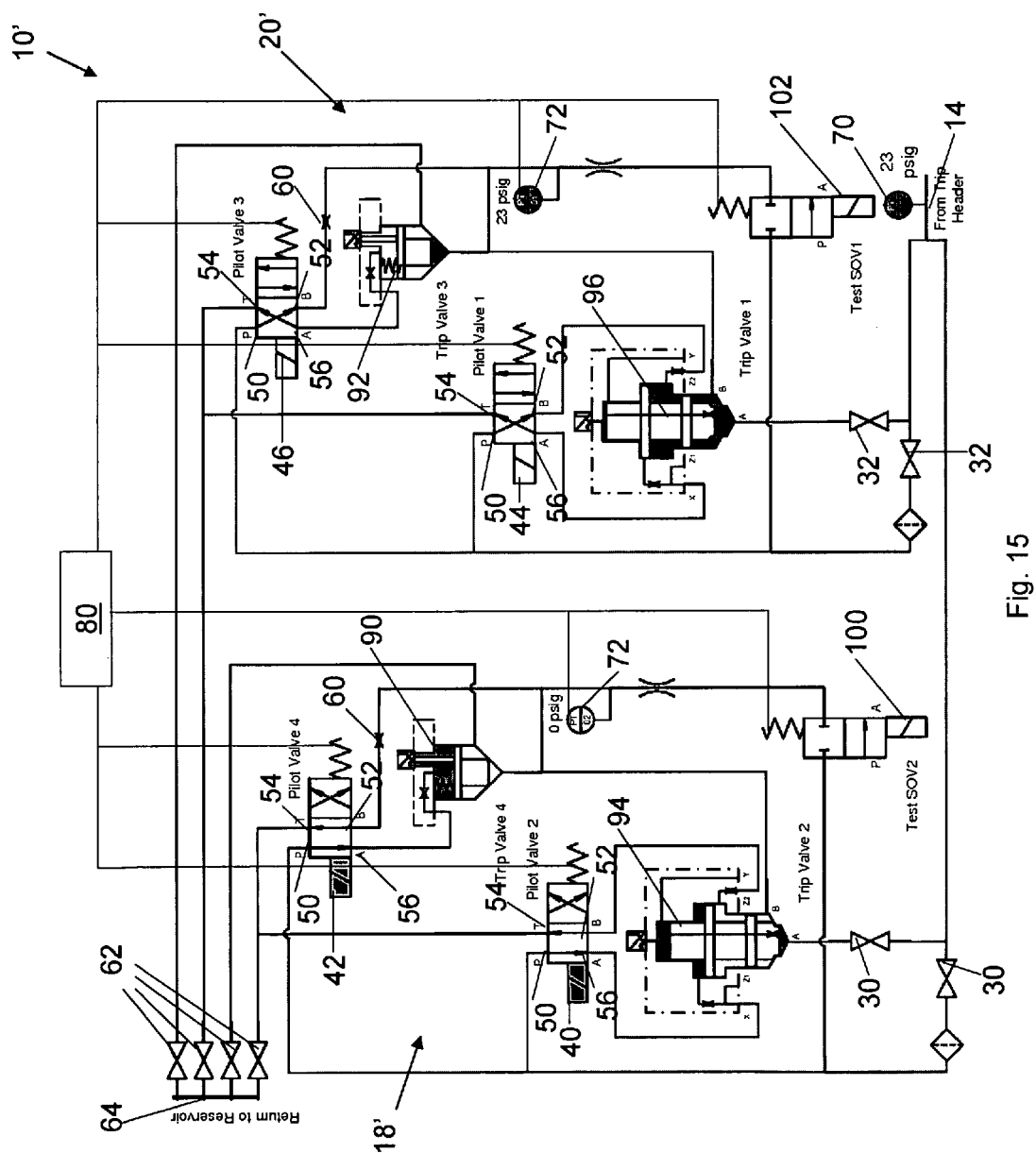

Referring now to FIGS. 14 and 15, de-energization of both valves of either SOV pair 18, 20 will drop pressure at trip header 14 below the threshold level, as shown at gauge 70. In FIG. 14, valves 40 and 42 of SOV pair 18' have been de-energized, while in FIG. 15, both valves of SOV pair 20' have been de-energized. In these instances, when both valves are de-energized, both slave valves within a valve pair 18' or 20' are opened, which serves to vent fluid to reservoir 64. Thus, de-energization of both valves of either SOV pair 18', 20' may serve to sufficiently lower pressure in trip header 14 (as shown by pressure gauge 70) to effectively shut down a process (e.g., a turbine) in the event of an emergency.

It should be recognized that this configuration 10' will maintain fluid pressure above the threshold value even in the event two valves from different SOV pairs 18', 20' are de-energized. This is because an uninterrupted path from trip header 14 to reservoir 64 is provided only when both pilot valves of a pair 18', 20' are opened.

As with embodiment 10 discussed hereinabove, this configuration 10' may be provided with pressure transducers/gauges 70 and 72 to monitor the actual state of the system. Outputs of these pressure switches/gauges 70, 72 may be communicably coupled to process control system 80 which may also be communicably coupled to each valve 40, 42, 44, 46, as shown. System 80 may thus be programmed to periodically de-energize each valve and capture the output of the various pressure transducers/gauges to confirm proper operation. Control system 80 may also be coupled to one or more pressure gauges, such as gauges 66, 68, etc., of configuration 10, to provide enhanced monitoring capabilities.

Figure 16:
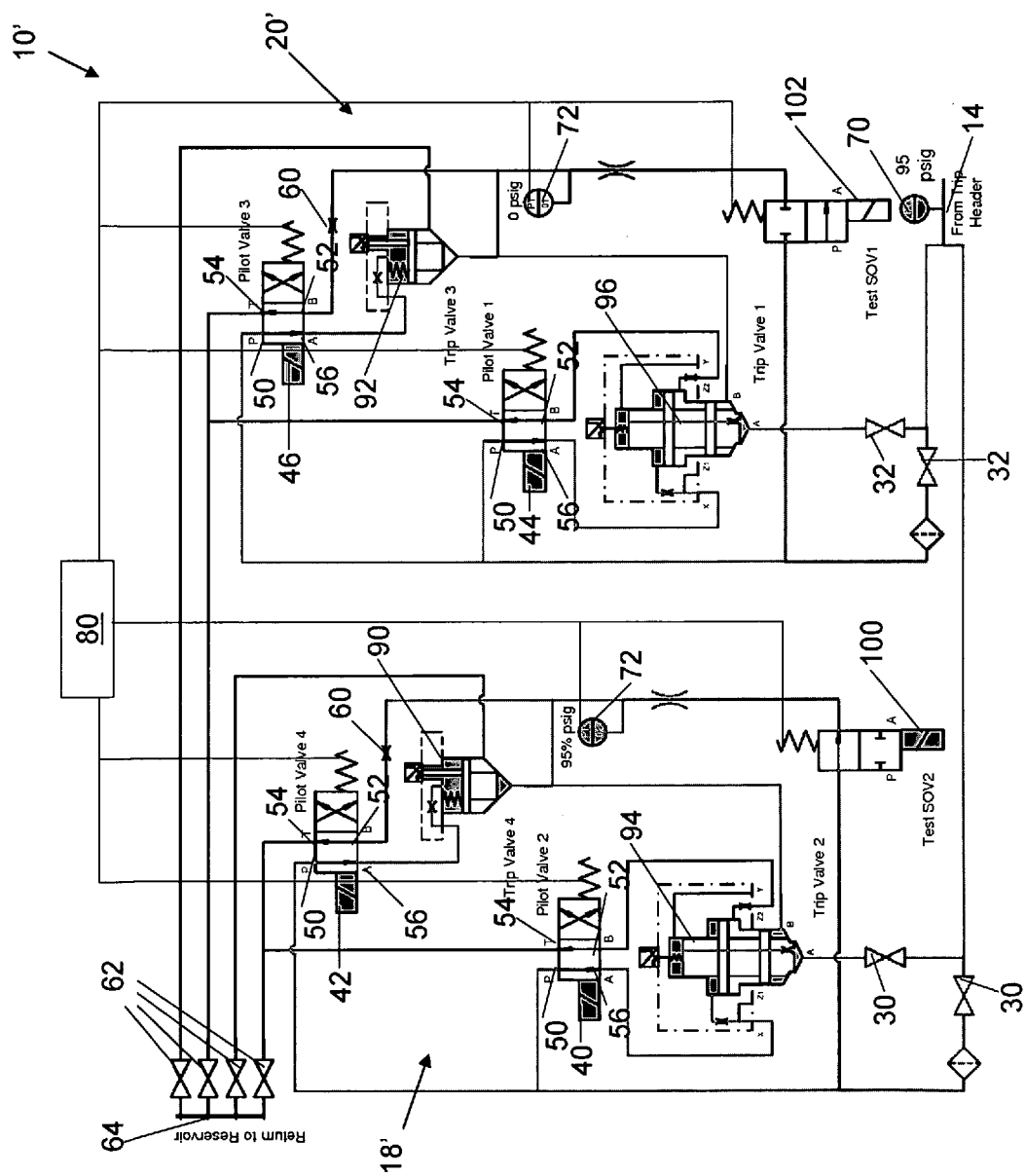
Figure 17:
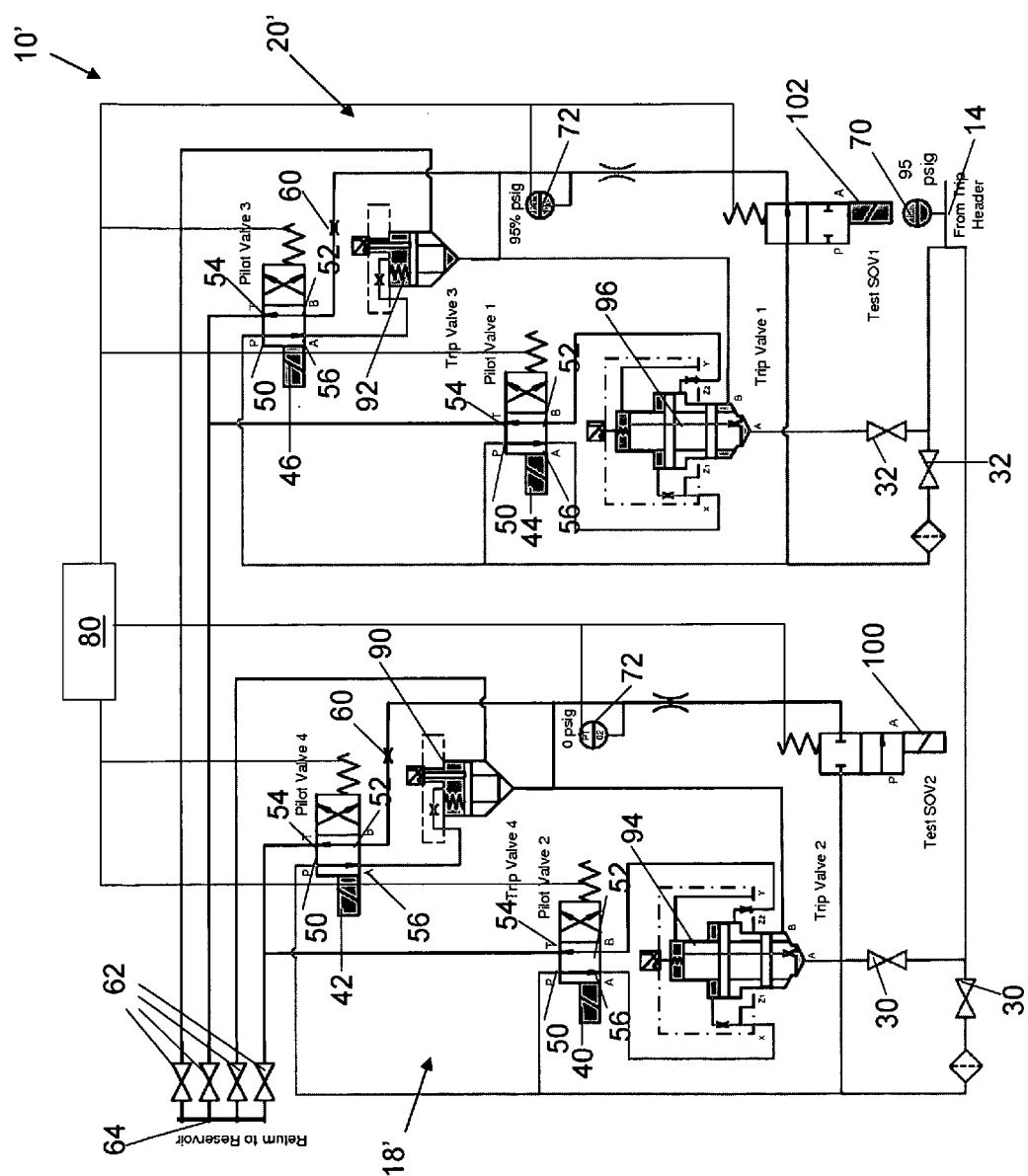

Moreover, as shown in FIGS. 16 and 17, test valves 100, 102 may also be used, in conjunction with pressure switches 72, to verify the presence of over-threshold fluid pressure within the SOV pairs 18', 20'. In this regard, test valves 100, 102, may be selectively actuated by system 80 to supply fluid pressures which are then captured by system 80 via transducers 72. Flow restriction 60 downstream of each switch 72 serves to prevent excessive pressure and fluid loss to reservoir 64 during this testing.

This embodiment thus enables each solenoid valve to be automatically actuated and tested without disrupting fluid flow to trip header 14. In this manner, the solenoid arrangement 10' may be frequently tested without disrupting plant process operation. In addition, safety is enhanced by dropping fluid pressure at trip header 14 upon de-energization of less than a full complement of the solenoid valves, i.e., fluid pressure may be dropped upon a change of state of as few as two of the solenoid valves. This effectively permits solenoid arrangement 10' to safely drop fluid pressure even in the event one of the valves 40, 42, 44, 46 fails in its energized state and becomes non-operational. Such safety is achieved while providing the low spurious trip rate achieved by requiring at least two solenoids to change state before terminating fluid flow.

Moreover, as mentioned hereinabove, embodiments of the invention enable components thereof, i.e., within a particular SOV pair 18', 20', to be isolated for service and/or replacement, without taking configuration 10' off-line or otherwise leaving the process unprotected.

The voting solenoid arrangements 10 and 10' of the present invention including the various block and throttle valves 22-25, 30, 32, 62, etc., and pressure transducers/gauges, may be implemented in any convenient manner. For example, the components thereof may be coupled to one another as shown and described herein, using suitable conduit or channel means such as tubing fabricated from a flexible polymeric material, or from a metallic, material such as steel, copper, etc. In particular embodiments, these configurations are disposed within a unitary manifold (not shown) which incorporates the fluid flow paths therein. The remaining components, e.g., various block and throttle valves, etc., may also be disposed within the manifold if desired. Use of such a manifold, with the fluid pathways or conduits integrally disposed therein, may tend to reduce installation and maintenance cost relative to non-manifolded arrangements.

It should be understood that any of the features described with respect to one of the embodiments described herein may be similarly applied to any of the other embodiments described herein without departing from the scope of the present invention.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A voting solenoid arrangement configured to selectively apply fluid pressure above and below a threshold value, to a fluid node, said voting solenoid arrangement comprising:
   first and second solenoid valve pairs, each pair including first and second solenoid valves;
   said valve pairs being disposed in parallel fluid communication with a fluid pressure source;
   each of said first and second solenoid valves being alternately actuatable between energized and de-energized states;
   wherein a change of state of the first and second valves of either of said valve pairs is configured to alternately apply fluid pressure above and below the threshold value, to the fluid node.

2. The voting solenoid arrangement of claim 1, wherein said valve pairs are selectively disposed in parallel fluid communication with a low pressure fluid reservoir, said low pressure being below the threshold value.

3. The voting solenoid arrangement of claim 2, wherein said fluid pressure source comprises said fluid node.

4. The voting solenoid arrangement of claim 3, wherein each of said valve pairs comprises a pair of pilot valves disposed in fluid communication therewith.

5. The voting solenoid arrangement of claim 4, comprising a test solenoid valve disposed for fluid communication between the fluid node and each of said valve pairs.

6. The voting solenoid arrangement of claim 1, wherein said first and second solenoid valves of said valve pairs each comprise four port, two position solenoid valves.

7. The voting solenoid arrangement of claim 6, wherein said four port, two position solenoid valves comprise a pair of common ports which are selectively couplable in fluid communication to one another, and to two other ports, said alternate actuation including alternately coupling said pair of common ports to one another, and to a mutually distinct one of said two other ports.

8. The voting solenoid arrangement of claim 1, wherein:
said first and second solenoid valves are each coupled in fluid communication with a fluid supply;
said first and second solenoid valves of each valve pair are disposed in fluid communication with one another; and
said second solenoid valves are each coupled in fluid communication with said fluid node.

9. The voting solenoid arrangement of claim 8, wherein:
each of said first and second solenoid valves comprise a plurality of upstream ports and a plurality of downstream ports;
the fluid supply is coupled to an upstream one of said common ports of each of said first and second solenoid valves;
the fluid node is couple to a downstream one of said common ports of said second solenoid valves;
the low pressure reservoir is coupled to a downstream one of said other ports of said first and second solenoid valves, and to an upstream one of said other ports of said first solenoid valves; and
a downstream one of said common ports of said first solenoid valves being respectively coupled to an upstream one of said other ports of said second solenoid valves.

10. The voting solenoid arrangement of claim 1, further comprising a plurality of shut-off valves configured to selectively isolate either one of said valve pairs from the fluid node, wherein the applied pressure is maintained by the other of said valve pairs.

11. The voting solenoid arrangement of claim 10, wherein when one of said valve pairs is isolated, a change of state of the first and second valves of the other of said valve pairs is configured to alternately apply fluid pressure above and below the threshold value, to the fluid node.

12. The voting solenoid arrangement of claim 1, wherein the fluid comprises hydraulic fluid.

13. The voting solenoid arrangement of claim 1, wherein the applied fluid pressure is above the threshold pressure when said first and second solenoid valves of either of said valve pairs are disposed in said energized state.

14. The voting solenoid arrangement of claim 13, wherein any one of said first and second solenoid valves of said first and second valve pairs is configured for being disposed in said de-energized state without dropping the applied fluid pressure below the threshold pressure.

15. The voting solenoid arrangement of claim 1, further comprising a plurality of pressure sensors operatively associated with one or more of said first and second solenoid valves to indicate the state thereof.

16. The voting solenoid arrangement of claim 15, wherein said plurality of pressure sensors is configured to indicate the state of each of said first and second solenoid valves.

17. The voting solenoid arrangement of claim 15, wherein said first and second solenoid valves are configured for being individually tested without dropping the applied fluid pressure below the threshold pressure.

18. A method for selectively applying fluid pressure above and below a threshold value to a fluid node, the method comprising:
providing first and second solenoid valve pairs, each pair including first and second solenoid valves;
said first and second solenoid valves being alternately actuatable between energized and de-energized states;
disposing said valve pairs in parallel fluid communication with a fluid pressure source;
disposing the first and second solenoid valves in fluid communication with one another wherein a change of state of the first and second solenoid valves of either of said valve pairs is configured to alternately apply fluid pressure above and below the threshold value, to the fluid node.

19. A voting solenoid arrangement configured to selectively apply fluid pressure above and below a threshold value, to a fluid node, said voting solenoid arrangement comprising:
first and second solenoid valve pairs, each pair including first and second solenoid valves;
said valve pairs being disposed in parallel fluid communication with a fluid pressure source;
each of said first and second solenoid valves being alternately actuatable between energized and de-energized states;
wherein a change of state of the first and second valves of either of said valve pairs is configured to alternately apply fluid pressure above and below the threshold value, to the fluid node;
said valve pairs being selectively disposed in parallel fluid communication with a low pressure fluid reservoir, said low pressure being below the threshold value;
a plurality of shut-off valves configured to selectively isolate either one of said valve pairs from the fluid node, wherein the applied pressure is maintained by the other of said valve pairs;
a plurality of pressure sensors operatively associated with one or more of said first and second solenoid valves to indicate the state thereof; and
the applied fluid pressure configured to be above the threshold pressure when said first and second solenoid valves of either of said valve pairs are disposed in said energized state.

* * * * *